July 14, 1959 — B. L. SCHATZLEY ET AL — 2,894,327

OBLIQUE AERIAL PHOTOGRAPHIC PLOTTING TEMPLATE

Filed March 13, 1957

INVENTORS
BYRON L. SCHATZLEY
DANA C. PARKER
BY
ATTORNEYS

United States Patent Office 2,894,327
Patented July 14, 1959

2,894,327

OBLIQUE AERIAL PHOTOGRAPHIC PLOTTING TEMPLATE

Byron L. Schatzley, Dayton, Ohio, and Dana C. Parker, St. Johns, Mich., assignors to the United States of America as represented by the Secretary of the Air Force Application March 13, 1957, Serial No. 645,877

7 Claims. (Cl. 33—1)

(Granted under Title 35, U.S. Code (1952), sec. 266)

The invention described herein may be manufactured and used by or for the United States Government for governmental purposes without payment to us of any royalty thereon.

This invention relates to mapping and plotting devices and more particularly to an oblique aerial photographic template or photograph interpretation equipment for rapidly and accurately plotting oblique photographic coverage on standard maps and charts, without time consuming inspection and questionable accuracy.

A further object is the provision of an adjustable map plotting template which will plot the limits of oblique photography regardless of height, focal length, and depression angle onto standard charts of 1:250,000 and 1:500,000 scale, which will provide means for recording photographic coverage from "tri-met" photographic reconnaissance missions to be plotted on transparent overlays, coded, and filed so that the area coverage can be rapidly determined by simply "pulling" the coded overlay from the files and placing the same over the proper local or sectional chart, such overlays being made to contain all necessary data and information as to the type of photographic coverage.

The template is preferably rectangular and includes a near point distance scale and a spaced parallel far point adjustable distance scale, a pair of elongated and straight edge cursors adjustable toward or away from each other on the near point distance scale at one of their ends and adjustable toward and away from each other along the far point scale nautical milage distance indicating scale means for indicating the angle of coverage of the photograph and the reasonable distance of recognizable clarity in the photograph, also including a compass rose, or a semi-compass rose around the bottom of the template for orienting the template relative to the flight path at the time the area covered by the template was made. The template, including clamping means for securing the two straight edge cursors in their adjusted positions.

A further object is the provision of adjustable template means which can be used for determining the coverage of vertical photographics as well as oblique photographs.

Like reference characters refer to like parts in the several figures of the drawings in which.

Figures 1, 3:
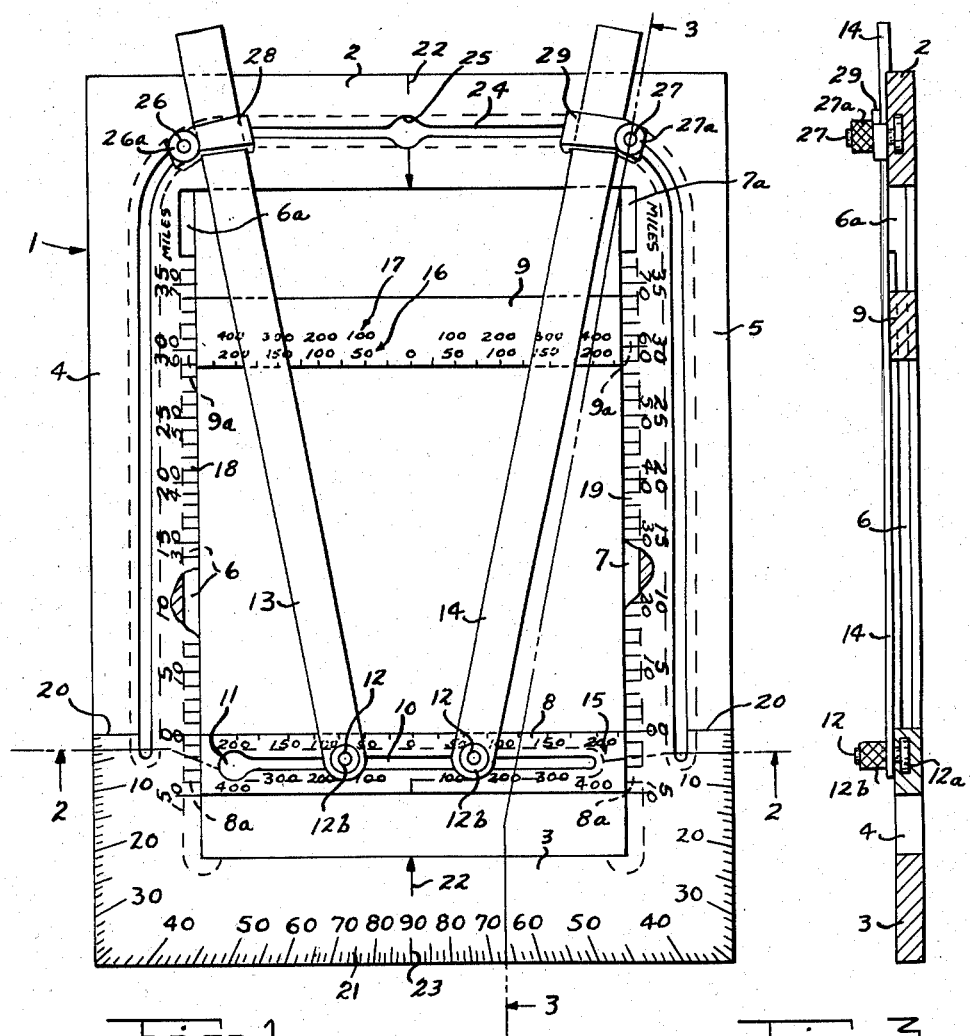
Figure 1 is a perspective plan view of the improved template device.
Figure 3 is a longitudinal sectional view taken about on the plane indicated by line 3—3 in Figure 1.
Figure 2:
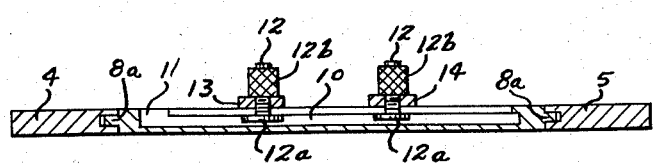
Figure 2 is a transverse sectional view taken about on the plane indicated by line 2—2 in Figure 1.

Referring to the drawings the reference numeral 1 denotes an elongated rectangular flat frame having top and bottom frame members 2 and 3 and right and left side frame members 4 and 5. The inner edges of the frame members 4 and 5 are formed with grooves or channels 6 and 7 having cutaway portions forming receiving openings 6a and 7a to receive a pair of near distance and far distance scale bars 8 and 9, these bars having tongue members 8a and 9a respectively disposed to slide in the channels 6 and 7 in parallel relation to each other and to the end frame members 2 and 3.

The scale bars 8 and 9 are made to preferably dispose the upper surfaces thereof flush or nearly flush with the upper surface of the frame 1, also the bars are readily adjustable toward and away from each other but should have slight frictional engagement to yieldably retain them in any of their adjusted positions. The lower or near scale bar is provided with a pair of cursors 13 and 14 which may be clamped to retain this bar 8 in its adjusted positions.

The bar 8 is formed with a bayonet type slot 10 having an enlarged entrance or opening 11 at one end to receive the heads 12a of the clamping screws 12. These screws pass through fitted opening in the lower ends of the pair of elongated cursors or straight edge blades 13 and 14 and knurled clamping nuts or thumb nuts 12b are provided which are manually tightened on the screws 12 and the blades 13 and 14 to retain the lower or inner ends of the cursors 13 and 14 in their adjusted spaced positions relative to a map scale indicia 15. As shown this scale indicia 15 is arranged to indicate a 1:250,000 scale above the slot 10 and a 1:500,000 scale below the slot.

The scale is arranged to dispose the zero mark on a median or longitudinal center line 22 of the frame 1. The upper or far scale bar 9 is provided with similar 1:250,000 and 1:500,000 map scales 16 and 17 with the zero or scale center on the center line 22 of the frame 1.

The side frame members 4 and 5 have similar nautical milage scales on their adjacent or inner edges, as indicated 18 and 19, starting with a transverse zero or lubber line 20 extending across the frame 1. The milage scales as shown are divided in units of five, up to 38 nautical miles (distance). It might be noted that the width of the two scale bars 8 and 9, as shown, is equal to a distance on the milage scale equal to 5 nautical miles also that the scales 18 and 19 are indexed to indicate a distance of 5 miles below the zero mile lubber line 20, on one of the map ratio scales.

The lower or near end of the frame 1 is inscribed with a sort of semi-compass rose indicia 21 having its base on the line 20 and radii intersecting the line 20 and the median line 22 at their intersection, divided equally in degrees from a 90° mid point 23 to the zero points right and left on the opposite ends of the line 20.

As shown the center of the compass rose is located on the top edge of the near distance bar 8 at the center thereof.

The upper and side frame members 2, 4 and 5 of the frame 1 are formed with a continuous bayonet slot 24, curving around the corner portions of the frame on the front face with the ends of the slot 24 extending downward slightly below the line 20 as shown. At the top center is an enlarged clamp screw receiving opening 25 for receiving a pair of headed clamp screws 26 and 27 having heads riding in the widened portions of the slots. A pair of straight edge or cursor guide clamps 28 and 29 straddle the cursor blades 13 and 14 and are tightened in position by knurled thumb nuts 26a and 27a to position the remote or upper ends of the cursors in their adjusted positions relative to the distance scales 16 and 17 on the bar member 9. Any suitable lug means (not shown) may be provided on the enlarged heads of the screw members (12, 26 and 27) to prevent the screw members from rotating as the thumb nuts 12b (or 27a) are tightened (or loosened), for instance, the portion of the screw shank below the top surface of the frame 1 may be squared to prevent them from rotating in their slots 10 and 24.

The plotting template is preferably made entirely of transparent material such as "Plexiglas" with the exception of the clamping screws 12, 26 and 27 and the clamping nuts 12ᵇ and 26ᵃ and 27ᵃ, which are metallic for strength.

The template will plot the limits of oblique photography regardless of height, focal length, and depression angle, onto standard maps or charts of 1:250,000 and 1:500,000 scale. This will allow records of photographic coverage from "tri-met" photo-reconnaissance missions to be plotted on transparent overlays, coded, and filed. This area coverage can be readily determined by simply "pulling" the coded overlays from the files and placing it over the proper local or sectional charts. Such overlays will contain all necessary data and information as to the type of photographic coverage.

In setting the template for making overlays for any particular mission the near point distance and scale of the oblique photographs are first determined. The distance from the nadir point to the upper edge of the area to be included in the photograph should be known or calculated. As shown the lower edge of the oblique photograph passes through the nadir point (directly below). This can be accomplished in a conventional manner from an oblique graphical calculator or from mathematics and calculations on paper. This involves the inclination of the oblique camera relative to the vertical and the focal length of the camera and field or angle of view, preferably in degrees. Next the distance and scale to any other point is noted. Preferably, this point will be on or above the horizontal axis and can be the far point if within the range of the template. First the template is placed on the overlay which has been securely fastened and oriented over the map. The zero marks on the base line 20 are placed over the trace of the flight line on the overlay with the center point (zero point) on the rear edge of the lower sliding arm or near scale bar 8 centered on the nadir point which has been determined from the plot of vertical coverage. Next the near point distance and the other or far point distance covered in each photograph are set up by the adjustment of the near scale bar 8 and the adjustment of the far distance scale bar 9 relative to the nadir or zero scale line 20. For instance, if the coverage is from the vertical to a remote distance of 29 nautical miles the bars 8 and 9 would be positioned as shown.

The two cursors 13 and 14 are adjusted and locked over the near point scale 15 by the thumb nuts 12ᵇ and the far ends of the cursors are adjusted along the slot 24 in accordance with the far scale "field of view" as determined by the relation of the adjacent edges of the cursors 13 and 14 relative to the scale indicia 16 or 17. The same ratio scale must, of course, be employed on both scale bars 8 and 9 in setting the cursors.

As shown, the nadir point coverage stands at about 100 on scale 1:250,000 scale 15, distance scale 29 nautical mile, and the far distance field scale 16 is set at about 280 (140 at each side of center). This represents the fan shaped area covered by the oblique photograph. This represents the oblique coverage area for one photograph of a photographic mission, and the whole mission can be plotted with only one setting of the template, providing, of course, that the variables of altitude, focal length, and depression angle remain approximately the same for any one mission.

While the template is intended primarily for oblique coverage plotting it can be employed in some instances for plotting vertical coverage.

The scale of the vertical photograph is determined and the nadir point is spotted on the overlay. The template is then placed on the overlay with the lower edge of the lower bar 3 oriented on the zero line 20 of the (semi) compass rose 21. The heading of the aircraft is turned off by using the compass rose indicia. In order to determine the coverage in miles the lower or near distance bar 8 is moved down one half the coverage distance in nautical miles, according to the scale values on scales 18 and 19. If the coverage area is 10 nautical miles the bar 8 would, in the construction illustrated, be moved down a related map scale distance below the nadir point at the center of the lubber line 20 equal to five nautical miles. The two cursors 13 and 14 would then be adjusted laterally on the lower bar 8 over the scale mileage value from the zero point on the proper scale value 15 and then locked by the clamp screws 12ᵇ with the adjacent edges in register with the proper scale distance values. The adjacent edges of the far ends of the cursors should be then brought into register with the proper scale values on the upper bar 9. In a square "vertical" coverage this would bring the cursors into parallel relation. Next the spacing between the adjacent edges of the two bars is determined according to the scaled mileage coverage and the upper bar is then adjusted downwardly to dispose the lower edge of the upper bar 9 a distance above the lubber line 20 equal to the distance of the upper edge of the lower bar 8 below the lubber line 20.

The area inclosed by the adjacent edges of the two cursors 13 and 14 and the two bars 8 and 9 now represents the scaled map coverage on the vertical photographs and the overlay can then be marked or outlined when the nadir point on the photograph is placed in register with the intersection of the two lines 20 and 22 on the template frame and the frame oriented, as indicated above.

Another method for determining vertical photograph coverage is to utilize dividers to measure the (scale) distance on the lower bar 8 from the zero point to the correct scale value on the lower bar 8. The lower bar is then moved down this distance from the zero miles mark and the upper sliding bar 9 is moved up the same distance. The two cursors 13 and 14 are then adjusted in parallel relation accordingly to correspond with the "lateral" photographic coverage from the line 22 and locked in place by the clamp screws 12ᵇ and 27ᵃ.

In conclusion, the plotting template can be used to accurately and rapidly plot the areas of oblique photographs onto standard aeronautical maps and charts. Its use is not limited by variables of altitude, focal length, or depression angle. One setting of the template will be sufficient to plot an entire mission of "tri-met" photography.

When the template is adjusted for the proper coverage of oblique photographs one of the standard scales used for determining the degree of visibility at the time the mission is accomplished often plays an important part in distinguishing desirable distant objects on the photographs. Sometimes the distant objects, although within the photographic coverage, are indistinguishable on the photographs. By adjusting the template to correspond to the scales 18, 19 in oblique photographs, and placing the same on a corresponding map, properly oriented, the side scales 18 and 19 can be employed to indicate actual distances of objects on the map which are not clearly visible on the photographs.

Obviously, modifications and variations of the present invention are possible to one skilled in the art without departing from the spirit and scope of the invention as defined in the accompanying claims.

We claim:

1. A mapping template for plotting the limits of aerial photographs regardless of height, focal lengths and depression angles on mapping charts having standard scales comprising, an open frame for inclosing the photographed area to be mapped, a pair of elongated map scale members extending across said frame in parallel relation, both of said map scale members having corresponding map scale indicia along their adjacent edges each extending in opposite directions from central points in the lengths thereof, one of said map scale members being adjustably mounted on said frame for parallel adjustments relative to other map scale member to determine the distance of photographic coverage on a standard mapping chart in one direction, a pair of straight edge cursor members disposed on said frame in adjustable spaced relation to each other extending between said map scale members for the registration of their adjacent edges with said map scale indicia on both of said map scale members to determine the distance of photographic coverage on said standard mapping charts in a transverse direction, adjustable securing means between one end of each of said straight edge cursor members and said frame for securing said cursors in said adjusted positions across said map scale members, adjustable securing means between the opposite end of each of said cursor members and one of said map scale members, and a nautical milage distance scale on said frame extending between said map scale members for registration with said map scale members for determining photographic coverage on said chart between the adjacent edges of said map scale members in nautical milage.

2. A mapping template for plotting the limits of aerial photograph coverage in transverse directions regardless of height, focal lengths, and depression angles on mapping charts having standard scales comprising, an open frame for inclosing the photographed area to be mapped, a pair of elongated straight edge map scale members extending across said frame in parallel relation to each other, said map scale members having corresponding map scale distance indicia extending along their longitudinal edges corresponding to the map scale of a standard mapping chart, said indicia extending in opposite directions from corresponding central points in the length of each of said map scale members, at least one of said map scale members being adjustable on said frame for parallel adjustments relative to the other of said map scale members to determine the photographic coverage on the standard mapping chart in one direction, a pair of adjustable straight edge cursor members adjustably connected at one of their ends to said frame in spaced relation to each other at opposite sides of said central points aforesaid and extending across both of said map scale members for registration of said cursor members at spaced points with said map scale indicia on both of said map scale members to determine the photographic coverage on said standard mapping chart in a direction transverse to said one direction, means for adjustably securing the opposite ends of said cursors in said adjusted spaced relation to each other on said map scale members.

3. A mapping template as set forth in claim 2, including a similar nautical milage indicia scale means on both sides of said frame extending between said parallel map scale members having a linear distance value equal to the scale of the mapping chart, disposed for registration with said movable map scale members.

4. Apparatus as claimed in claim 3 in which said nautical milage indicia scale has a zero lubber line and scale members are independently adjustable toward and away from each other in registration with said nautical milage indicia scale means for spacing the said map scale members a predetermined distance apart and relative to said lubber line to indicate linear photographic coverage on said mapping chart in the first mentioned direction.

5. A mapping template for plotting the limits of aerial photographs regardless of height, focal lengths and depression angles on mapping charts having standard scales comprising, a rectangular open frame for inclosing the photographed area to be mapped on said charts, said frame comprising spaced parallel end frame members and spaced parallel side frame members, parallel guide means on the adjacent edges of said side frame members, a pair of elongated straight edge map scale members having their opposite ends disposed in guiding relation with said parallel guide means and disposed in parallel relation to each other and to said end frame members for parallel adjustment toward and away from each other, said open frame having a lubber line extending across said side frame members perpendicularly in adjacent spaced parallel relation to one of said end frame members, said open frame having a perpendicular central reference line extending across both of said end frame members, the projection of said reference line extending across said map scale members centrally to the longitudinal dimensions thereof, a semi-compass rose indicia extending around the last mentioned one of said end frame members and the adjacent portions of said side frame member between the opposite ends of said lubber line, said compass rose having zero degree indicia on the opposite ends of said lubber line and increasing in degrees to 90° indicia at said central reference line, said adjustable map scale member adjacent said last mentioned end of said open frame member having a longitudinal guide slot formed therein extending between said parallel guide means, a continuous guide channel formed in the face of said open frame extending longitudinally along both of said side frame members around the corners thereof across the end frame member which is opposite to the compass rose end of said open frame to points adjacent the opposite ends of said lubber line, a pair of straight edge cursors each pivoted for sliding adjustments in said guide slot at one of their ends at opposite sides of said central reference line, cursor guide means slidably adjustable in said guide channel at opposite sides of said central reference line toward and away from each other, securing means between each of said cursor guide means and said frame for adjustably securing said cursors in said frame in adjusted relation to said map scale members and map distance determining indicia extending along the adjacent edges of said map scale members in opposite directions from said central reference line for registration with the adjacent edges of said cursors and map scale distance determining indicia extending along the adjacent edges of said side frame members in opposite directions from said lubber line for registration with the adjacent longitudinal edges of said map scale members for setting the opening between said cursors and said map scale members in accord with the height, focal length and depression angle at which the photographs were made to determine the coverage of said photographs on said mapping charts.

6. In a mapping template for plotting the area limits of aerial photographs, regardless of height, focal lengths and depression angles on mapping charts having standard scales comprising, an elongated rectangular transparent flat open frame having parallel side frame members and parallel upper and lower end frame members, said side frame members having longitudinal guide slots formed in the adjacent edges thereof extending between said upper and lower end members, said upper end member and said side frame members having a continuous bayonet slot formed in the faces thereof, upper and lower elongated map scale members extending between said side frame members in parallel relation to the upper and lower frame members and to each other, tongue members on the ends of said map scale members disposed in parallel adjustment relation in guide slots for parallel movement toward and away from each other, said lower elongated map scale member having a face surface with a longitudinal bayonet slot formed therein extending in opposite directions from its center toward both of said side frame members, said frame having a lubber line across its upper surface adjacent said lower frame member, said frame member having a central reference line across said lower end frame member perpendicular to said lubber line and midway between the ends thereof, said frame having its upper surface indexed in degrees from zero at the opposite ends of said lubber line to 90° at the intersection of said central reference line, said upper and lower map scale members having similar linear distance indicia inscribed on the face surfaces thereof scaled to the distance scale of said mapping chart, said distance indicia increasing in opposite directions toward said side frame members from a zero point on said central reference line, said open frame having linear distance indicia calibrated in accord with the scale of said chart inscribed on the adjacent edges of said side frame members starting with zero at the opposite ends of said lubber line and increasing toward said upper map scale member, cursor pivot means adjustable in said slot in said lower map scale member toward and away from said central reference line, a pair of transparent elongated straight edge cursors each pivoted at one of their ends to said cursor pivot means and extending across said map scale members and said upper frame member at opposite sides of said central reference line with their adjacent edges adapted to register with said distance indicia on said map scale members, cursor securing guide means slidably adjustable in the first mentioned bayonet slot toward and away from said central reference line, said cursors being disposed in guiding engagement with said cursor guide means with their adjacent edges in cooperative registration with said linear scale indicia on said upper map scale member, and means for adjustably securing said guide means and pivot means in their adjusted position in said bayonet slots.

7. A template as defined in claim 6 in which said linear distance map scale indicia on said side frame members also increases in distance value downwardly from the zero toward said lower end frame member.

References Cited in the file of this patent

UNITED STATES PATENTS

| | | |
|---|---|---|
| 787,724 | Campton | Apr. 18, 1905 |
| 1,708,551 | Nell | Apr. 9, 1929 |
| 2,568,358 | Nahmens | Sept. 18, 1951 |

FOREIGN PATENTS

| | | |
|---|---|---|
| 424,040 | Germany | Jan. 15, 1926 |
| 426,363 | Germany | Mar. 10, 1926 |